United States Patent [19]

Takata et al.

[11] Patent Number: 4,784,580
[45] Date of Patent: Nov. 15, 1988

[54] AIRFLOW CONTROL SYSTEM

[75] Inventors: Nobuharu Takata; Kohji Kurita, both of Hyogo, Japan

[73] Assignee: Mitsubishi Denki Kabushiki Kaisha, Tokyo, Japan

[21] Appl. No.: 14,305

[22] Filed: Feb. 13, 1987

Related U.S. Application Data

[63] Continuation-in-part of Ser. No. 635,265, Jul. 27, 1984, abandoned.

[30] Foreign Application Priority Data

Jul. 30, 1983 [JP] Japan .................... 58-139571

[51] Int. Cl.4 ............................. F04B 49/00
[52] U.S. Cl. ................... 417/295; 417/300; 417/12; 417/28; 417/45; 318/773; 236/15 BD
[58] Field of Search ........... 417/300, 295, 290, 278, 417/279, 1, 12, 17-22, 26-28, 42, 43, 45; 318/773; 98/116; 236/15 C, 15 BD; 126/110 A, 112; 110/188

[56] References Cited

U.S. PATENT DOCUMENTS

| Re. 28,946 | 8/1976 | Martz et al. ............ 417/300 X |
|---|---|---|
| 2,482,597 | 9/1949 | Ritter .................. 417/12 X |
| 2,707,440 | 5/1955 | Long et al. ............. 417/12 |
| 2,741,986 | 4/1956 | Smith .................. 417/12 X |
| 4,181,099 | 1/1980 | Binstock ............ 236/15 BD X |
| 4,225,289 | 9/1980 | Burkett .............. 417/18 X |
| 4,370,605 | 1/1983 | Breznican ............. 318/773 |
| 4,462,217 | 7/1984 | Fehr .................. 417/45 X |
| 4,468,171 | 8/1984 | Katsumata et al. ...... 417/17 X |

FOREIGN PATENT DOCUMENTS

| 99207 | 8/1979 | Japan ................. 417/26 |
|---|---|---|
| 140115 | 10/1979 | Japan ................. 318/779 |
| 58-6077 | 2/1983 | Japan . |

Primary Examiner—Carlton R. Croyle
Assistant Examiner—Paul F. Neils
Attorney, Agent, or Firm—Bernard, Rothwell & Brown

[57] ABSTRACT

An airflow control system generates a compensating output which is combined with the normal damper control output in a damper operating device when a pole change motor driving a blower changes speed so that the damper is changed to compensate for the change in blower speed to avoid a large change in airflow. This overcomes the delay in the normal integrating damper control which produced unwanted fluctuation in airflow when the motor speed was changed.

4 Claims, 4 Drawing Sheets

AIRFLOW CONTROL SYSTEM

CROSS-REFERENCE TO RELATED APPLICATION

This application is a continuation-in-part of copending application Ser. No. 635,265 filed July 27, 1984, now abandoned.

BACKGROUND OF THE INVENTION

1. Field of the Invention

The present invention relates to a system of controlling the airflow output of a blower which is driven by a pole change motor and, particularly, to an airflow control system which causes less variation in the airflow when the number of poles of the driving motor is changed.

2. Description of the Prior Art

FIGS. 1(a) and (b) show the principle of the pole change motor, which comprises stator windings 1a, 1b, 2a, 2b, 3a, 3b, 4a, and 4b (shown diagrammatically for one phase) and rotor magnetic poles 5 (each pole shown by N or S). FIGS. 2(a) and 2(b) show the conventional pole change system, in which reference numeral 6 denotes stator windings including winding sections 61a, 61b, 62a, 62b, 63a, and 63b with terminals U1, U2, V1, V2, W1, and W2 associated thereto. Reference numerals 7, 8 and 9 denote switches, $V_R$, $V_S$ and $V_T$ denote the voltages of 3-phase power lines R, S and T, O denotes the neutral point of the stator winding, 10 denotes a rotor of the pole change motor, 11 denotes a blower, 12 denotes a shaft connecting the motor 10 and blower 11, 14 denotes an airflow adjustment device in which a bar 14a is operated vertically to move a damper 14b so that the air passage resistance is varied, 13 denotes a device for producing an output controlling the position of the damper 14b, and 15 and 16 denote the inlet side and outlet side of the air passage, respectively.

FIG. 1(a) shows diagrammatically, the arrangement of a 4-pole motor, while FIG. 1(b) shows the motor converted into a 6-pole arrangement by reversing the currents in the windings 2b, 3a, 3b and 4a as shown by the dashed lines. Thus, the stator windings are partly connected differently so as to vary the current in the windings, thereby to accomplish a change in the number of poles of the motor. While FIGS. 1(a) and 1(b) show, as an example, the arrangement of changing the direction of current, it is also possible to exchange phase currents and their directions. In the arrangement of FIG. 2(b), the switch 7 is closed and switches 8 and 9 are kept open for operating the motor at a low speed, while the switch 7 is opened and switches 8 and 9 are closed so as to change the number of poles by varying the current for operating the motor at a high speed.

The operation of FIGS. 1(a), 1(b), 2(a) and 2(b) in the change of the number of poles is as follows. Considering the current in phase R, the winding 61b of FIG. 2(b) is located between the terminal U2 and the neutral point O, and the current direction is not changed by switching. The winding 61b corresponds to the windings 1a, 1b, 2a and 4b of FIGS. 1(a) and 1(b). The winding 61a is located between the terminals U1 and U2, causing the current direction to be changed by switching. The winding 61a corresponds to windings 2b, 3a, 3b and 4a in FIGS. 1(a) and 1(b).

The rotational speed n of the motor is given as:

$$n = 120 f/P \text{ (RPM)} \tag{1}$$

where f represents the power frequency in Hertz, and P represents the number of poles of the motor. Accordingly, the motor speed can be varied by changing the number of poles. When the load of the motor varies, as in the case of a boiler blower which operates at a full load in the daytime and at a reduced load at night, the motor would be operated at a lower speed (increased number of poles) to meet a light load at night and at a high speed (decreased number of poles) to meet a heavy load in the daytime so as to minimize the total power consumption. The speed of the pole change motor is varied by changing the states of the switches 7, 8 and 9, and the output of the motor is conducted through the shaft 12 to the blower 11.

Referring now to FIG. 2(a), there are shown the airflow adjustment device 14 and the control signal producing device 13 provided for controlling the device 14. One input of a deviation detector 13c is supplied with an output voltage C from a boiler controller 13b. The output voltage C corresponds to the required airflow rate determined in accordance with various factors including the kind of the fuel used and the required power level. A second input of the deviation detector 13c receives signal X which is the value of the actual airflow to the boiler measured by airflow sensor 13a. The output of the deviation detector 13c, which is the difference between X and C, is converted to an output signal Y by an integrator 13d, the output Y being applied to a voltage-to-pressure converter 13e producing a variable pressure fed to the control device 14, which thus moves the damper 14b through the bar 14a in accordance with the control signal Y so as to control the amount of airflow. In FIG. 2(a), the output (Y), and the corresponding output from the control signal producing device 13 is varied until the actual airflow signal (X) becomes identical to the setting signal (C) by means of the deviation detector 13c and the integrator 13d, thereby to bring the airflow to a requisite set-value.

In the conventional airflow control system arranged as described above, when the motor speed is varied from high to low or from low to high, the correction of the airflow variation caused by the change in the motor speed is not in accord with the airflow variation caused by the damper 14b during the transient period because in usual cases, of the delay in the response time and the slow operation speed of the damper 14b. Therefore, if the blower 11 is used for a boiler, the combustion of the boiler could be extinguished or the internal pressure of the boiler could rise to a critical point of explosion, and the use of a pole change motor in such applications has not been appropriate.

The disadvantage in the prior art will be discussed below, using as an example a change-over operation from a low speed condition to a high speed condition. When the speed is changed from low to high, the revolution speed of the motor 10 is increased, with resulting increase of the airflow Q which is proportional to the motor speed. The increase in the airflow Q is reflected in an increase in the measured value X of the actual airflow which is compared with the desired airflow C in deviation detection 13c. The output Y from integrator 13d is represented by $(Y = \int (C-X)dt)$ which means that the output Y is decreased by the increase in X, thereby causing the damper 14b to be moved toward its closed position to decrease the airflow. Due to the integration by integrator 13d and mechanical inertia, the response speed of the damper 14b is slower than that of the motor 10 and therefore there is a time delay between the increase in speed of the motor and the actual movement of the damper toward its closed position, so that an undesirable increase in airflow occurs at the time of the change-over.

SUMMARY OF THE INVENTION

It is an object of the present invention to provide an airflow control system capable of suppressing a sharp variation in the airflow at the time of change of the number of poles of the blower motor, by matching the change in the speed of the blower motor with the change in the resistance of the air passage controlled by the airflow adjustment device.

According to the inventive airflow control system, the speed change or pole change command for the blower motor initiates a corresponding adjustment in the airflow adjustment device so that motor speed change and airflow adjustment device change occur simultaneously to avoid a large change in the airflow.

DESCRIPTION OF THE PREFERRED EMBODIMENTS

Figure 1A:
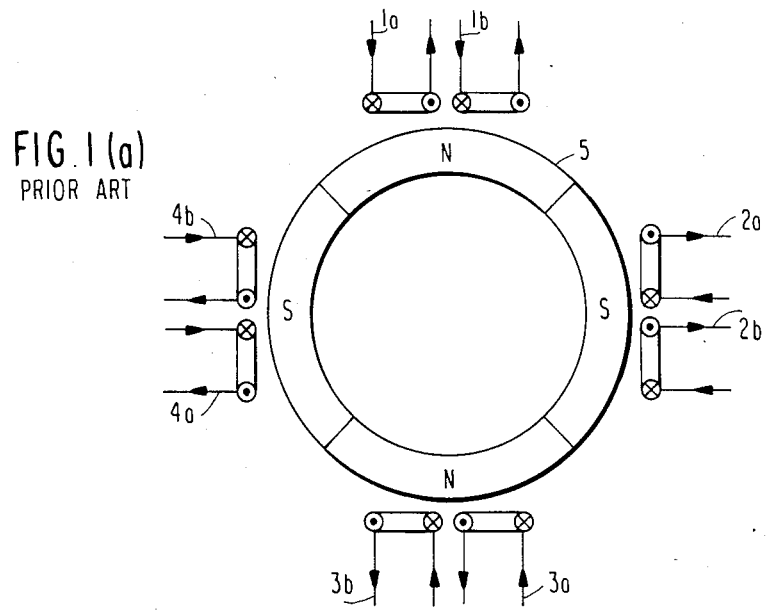
FIGS. 1(a) and 1(b) are diagrammatic illustrations showing the principle of a pole change motor.
Figure 1B:
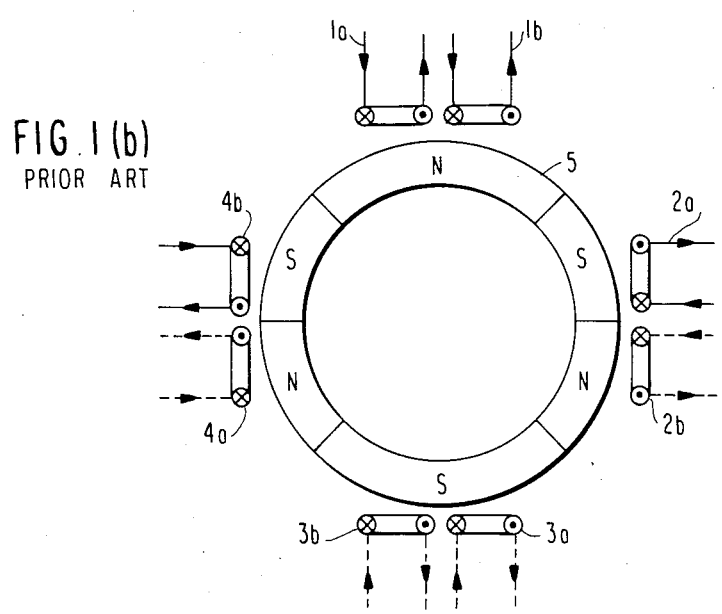
Figure 2A:
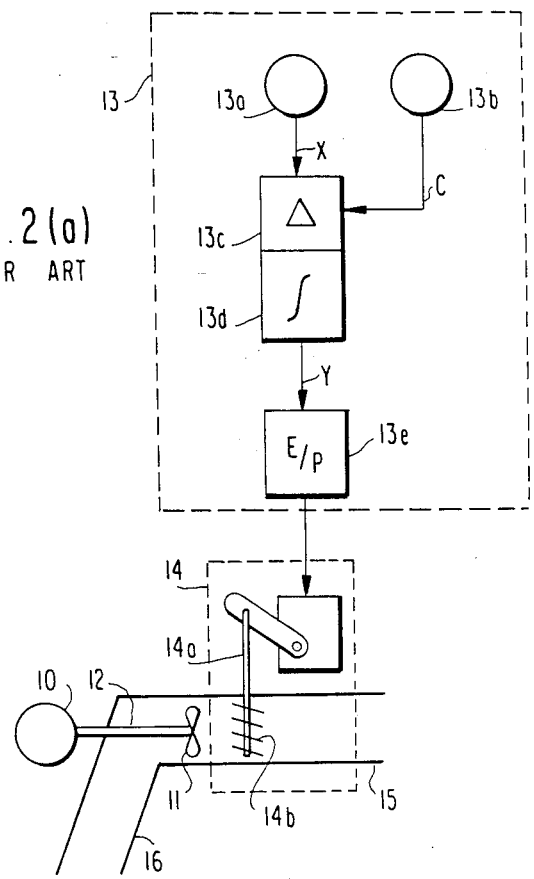
FIG. 2(a) is a diagrammatical cross-sectional view of a conventional airflow control system.

One embodiment of the present invention will now be described with reference to the drawings. In FIG. 3 reference numbers 17a and 17b denote advance control compensating generators, and reference numbers 18a and 18b denote activation signals given to the control generators 17a and 17b from the control crcuit of FIG. 4. 18Ta and 18Tb designate timers for providing timing periods during which respective control pressures are applied to the damper control 14 to overcome inertia and integration delay in changing the damper 14b when the motor poles are changed; 18La and 18Lb designate AND circuits each producing an output "1" when both inputs thereof are supplied with value "1" signals; Na and Nb designate NOT circuits for inverting the signals from the timers 18Ta and 18Tb to the AND gates 18La abd 18Lb; 18Ra and 18Rb designate output relays operated by the AND gates 18LA and 18Lb and having contacts 18Ra' and 18Rb', respectively, which are closed upon operation of the relay; BP and BN denote positive and negative voltages, respectively; and 18Ea and 18Eb denote converters for converting a voltage passed by respective contacts 18Ra' and 18Rb' from BP and BN into respective compensating pressures Za and Zb in the same manner as the converter 13e in FIG. 2. Other constituents referred to by common symbols with FIG. 2(a) are the counterparts.

Figure 2B:
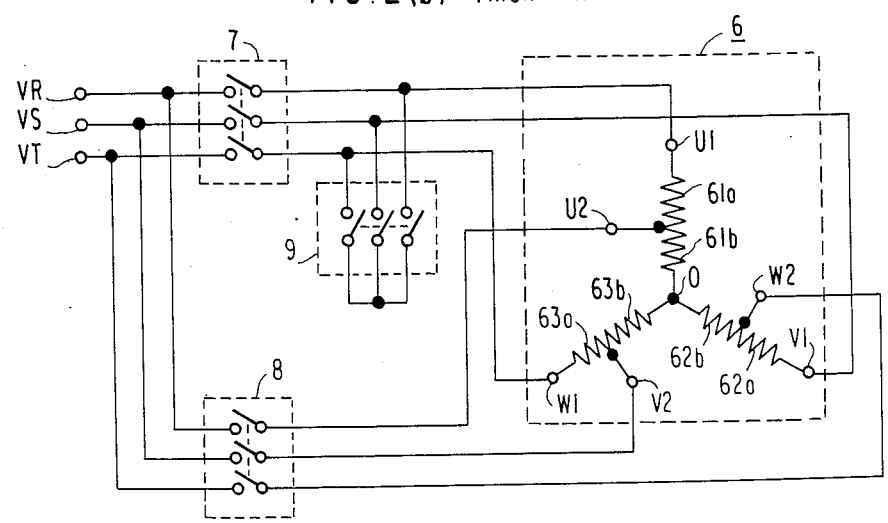
FIG. 2(b) is a schematic diagram of a pole change circuit for the motor in FIGS. 1(a), 1(b) and 2(a).
Figure 3:
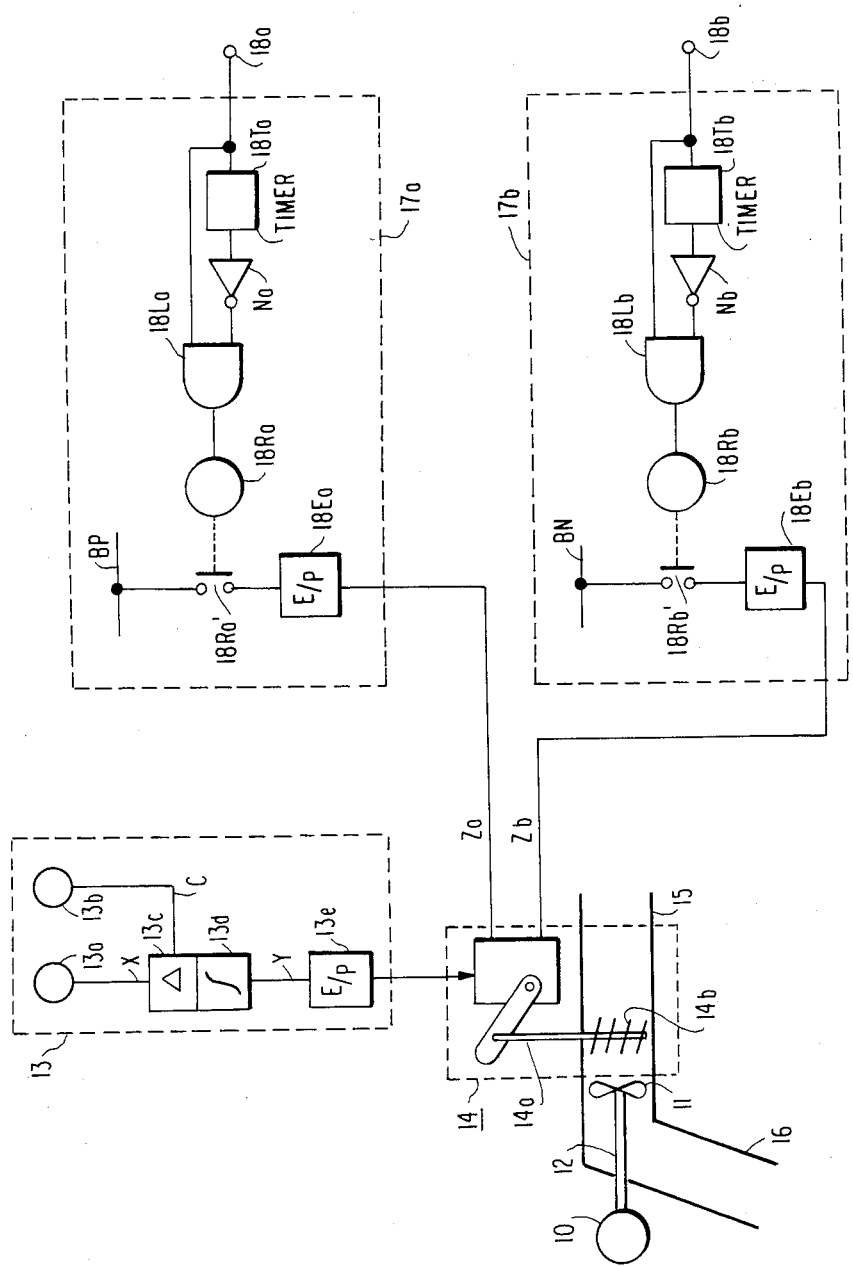
FIG. 3 is a diagrammatic vertical cross-sectional view of the airflow control system according to the present invention.
Figure 4:
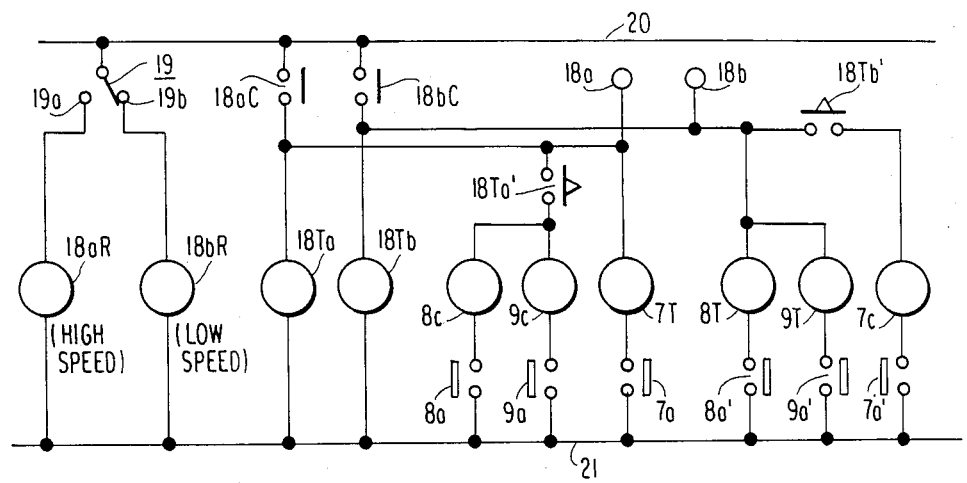
FIG. 4 is a schematic diagram of a control circuit for the system in FIG. 3.

FIG. 4 shows one embodiment of the control circuit for operating the motor pole change switches 7, 8 and 9 of FIG. 2(b) and for generating the activation signals 18a and 18b of FIG. 3. The circuit includes windings of relays 18aR and 18bR for generating the signals 18a and 18b in FIG. 3 when the contacts 18aC and 18bC of the relays 18aR and 18bR are closed; timers 18Ta and 18Tb for providing a delay between the tripping (opening) of one set of motor pole switches and the making (closing) of another set of motor pole switches; a pole switch 19 having a high-speed and low speed selection contacts 19a and 19b, respectively; making coils 7c, 8c and 9c of the switches 7, 8 and 9, trip coils 7T, 8T and 9T of the switches 7, 8 and 9, and control power lines 20 and 21 having positive and negative polarities, respectively. Contacts 8a, 9a, 7a, 8a', 9a' and 7a' are components of the respective switches 8, 9 and 7 for preventing burnout of the coils 8c, 9c, 7T, 8T, 9T and 7c; contacts 8a, 9a, 7a, 8a', 9a' and 7a' open when their respective coils 8c, 9c, 7T, 8T, 9T and 7c operate, and close when their counterpart coils 8T, 9T, 7c, 8c, 9c and 7T, respectively, operate.

Figure 5:
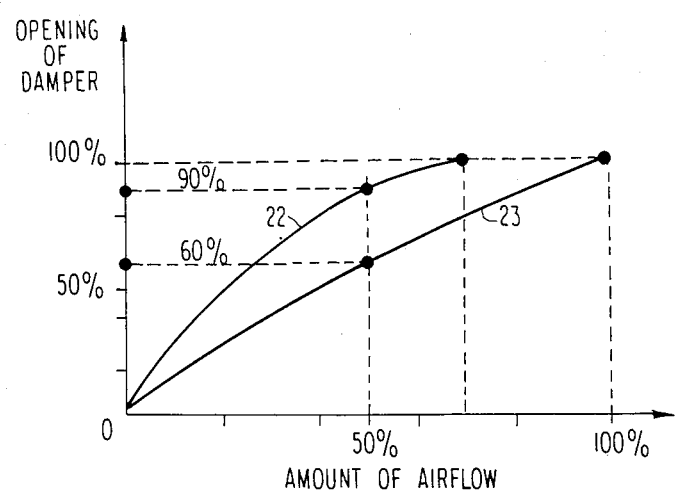
FIG. 5 is a graph showing the relationship between the opening of the damper and the amount of airflow of the system shown in FIG. 3.

FIG. 5 shows the amount of airflow versus the opening of the damper (it is fully open at 100% providing the minimum air passage resistance, and completely closed at 0% providing the maximum air passage resistance), plotted for two motor speeds as a parameter. On the graph, the curves 22 and 23 represent the airflow vs. damper opening characteristics at the low-speed and high-speed motor operations, respectively.

In the prior art system of FIGS. 2(a) and 2(b) when a pole change in the motor is made by operation of the switches 7, 8 and 9 the airflow characteristic changes from curve 22 to curve 23, or vice versa, and operation of damper 14 by control 13 to maintain the sensed airflow X equal to the set point C is delayed; whereas the embodiment of the present invention shown in FIG. 3 eliminates this delay to avoid an undesirable large change in the amount of airflow as follows. When the pole change command from low to high (or from high to low) is issued by moving switch 19 from contact 19b to 19a (or from contact 19a to 19b), relay 18aR (or 18bR) operates to close contacts 18aC (or18bC) which operates coil 7T (or coils 8T and 9T) to open the switch 7 (or the switches 8 and 9), and the signal 18a (or the signal 18b) is generated so that a corresponding control compensating generator 17a (or 17b) is activated. The signal 18a (or 18b) and the inverted output of unoperated timer 18Ta (or 18Tb) operate AND gate 18La (or 18Lb) to energize relay 18Ra (or 18Rb) operating voltage to pressure converter 18Ea (or 18Eb) to produce output pressure Za (or Zb). The compensating output Za (or Zb) of the control compensating generator 17a (or 17b) is fed to the airflow adjustment device 14 to be averaged therein with the normal control pressure from device 13e, thereby to initiate a change in the damper 14b. Upon expiration of the make delay period determined by the timer 18Ta, FIG. 4 (or 18Tb) after the signal 18a (or 18b) has been issued, contacts 18Ta' (or 18Tb') close to operate relay coils 8c and 9c (or coil 7c) to close the switches 8 and 9 (or switch 7), and the number of the poles of the motor is changed. The motor then proceeds to change its speed. The output Za (Zb) reduces (or increases) the opening of damper 14b simultaneous with the change in motor speed. Then the timer 18Ta (or 18Tb), FIG. 3, operates to cause AND gate 18La (or 18Lb) to go low and deenergize relay 18Ra (or 18Rb) and terminate the output Za (or Zb) and sole control of the damper operating device 14 returns to the control 13.

The time delay provided by timer 18Tb between the opening of the switches 8 and 9 and the closing of the switch 7 is selected for reducing any mechanical shock upon changing over the motor speed by connecting the motor to the power source for the low speed operation when the motor speed has been reduced to around the predetermined low speed. The time delay provided by timer 18Ta between the opening of the switch 7 and the closing of the switches 8 and 9 is selected to allow the residual voltage in the motor to be dissipated, thereby to reduce any transient mechanical shock upon changing over to high speed. Due to the delays of timers 18Ta and 18Tb, the signals 18a and 18b of FIG. 3 are given in advance of closing of the switches 7, 8 and 9 for changing the number of poles of the motor. Thus movement of the damper 14b can occur simultaneously with the change in motor speed in spite of the delay caused by mechanical inertia of the damper, and operation of pole change motor is made practical.

The values of BP and BN and the lengths of the periods of the timers 18Ta and 18Tb are selected to produce output pressures Za and Zb for durations so as to move the damper 14b from an operating point on curve 23 to the corresponding point on curve 22, or vice versa. For example the damper 14b could be moved from 60% open to 90% open simultaneously with the period between opening of switches 8 and 9 and closing of switch 7, or the damper could be moved from 90% open to 60% open after switches 8 and 9 open and simultaneously with the speedup of the motor when switch 7 is closed. Further adjustments of the damper will be made by control 13 in response to the sensing of a difference between the measured airflow value X and the setpoint value C. Thus the delay in movement of the damper 14b due to integration and mechanical inertia is compensated and the undesirable change in airflow occurring with the prior art control of FIG. 2(a) is greatly reduced.

Various changes and modifications can be made to the above-described embodiment. For example, digital techniques, i.e., computer controls, can be employed. The magnitude and durations of the compensating pressures Za and Zb applied to the device 14 can be varied in accordance with the setpoint airflow value C so as to produce the necessary adjustment of the damper opening without substantial overcompensation or undercompensation at different setpoint values. Various airflow adjustment devices other than the illustrated damper control, such as a vane control device, can be employed. The blower may be used for a purpose other than the described purpose of providing air to a boiler. The separate control variable generator 17a and 17b may be integrated, and their functions may employ a portion of the control variable generator 13 as their components.

It is claimed:

1. An airflow control system comprising
   a pole change motor having a plurality of stator windings,
   switch means for connecting the stator windings in a first arrangement producing a first number of poles and for connecting the stator windings in a second arrangement producing a second number of poles wherein the second number of poles is less than the first number of poles, with each of said first and second number of poles corresponding to different motor speeds;
   an air passage;
   a blower driven by the motor for producing airflow through the air passage;
   air passage variable resistance means within the air passage;
   control means including airflow sensing means and airflow set point means for operating the air passage variable resistance means so as to maintain the sensed airflow equal to the airflow set point;
   said control means and said air passage variable resistance means having an air control response delay substantially greater than a delay in the change of motor speed in response to operation of said switch means; and
   control compensating means connected between the switch means and the air passage variable resistance means for responding to the operation of the switch means to operate the air passage variable resistance means so that a change in the motor speed occurs simultaneously with an adjustment in the air passage variable resistance means to thereby minimize variation in airflow;
   said control compensating means including first and second control compensating generators which respond to operation of the switch means in changing the stator windings from said first arrangement to said second arrangement and respond to operation of the switch means in changing the stator windings from said second arrangement to said first arrangement, respectively, to apply corresponding compensating outputs to operate the air passage variable resistance means to increase and decrease, respectively, the resistance to airflow.

2. An airflow control system as claimed in claim 1 wherein each of said first and second control compensating generators includes a timer for producing the respective compensating output for a respective selected duration so as to delay the change in speed of the motor until after the said air passage variable resistance means has been operated so that the actual speed change of the motor and the adjustment of the air passage variable resistance means occur simultaneously.

3. An airflow control system as claimed in claim 2 wherein the air passage variable resistance means includes a damper and damper opening and closing means for responding to outputs from said control means and said first and second control compensating generators.

4. An airflow control system as claimed in claim 3 wherein control means includes means for determining a difference between the sensed airflow and the airflow set point, and integration means for integrating the difference to produce an output operating the damper opening and closing means.

* * * * *

UNITED STATES PATENT AND TRADEMARK OFFICE
CERTIFICATE OF CORRECTION

PATENT NO. : 4,784,580

DATED : November 15, 1988

INVENTOR(S) : Nobuharu Takata et al.

It is certified that error appears in the above-identified patent and that said Letters Patent is hereby corrected as shown below:

Column 2, lines 22 and 23, "airilow" should be --airflow--.

Signed and Sealed this

Twelfth Day of December, 1989

Attest:

JEFFREY M. SAMUELS

Attesting Officer  Acting Commissioner of Patents and Trademarks